United States Patent [19]

Appel

[11] Patent Number: 5,153,768
[45] Date of Patent: Oct. 6, 1992

[54] MULTIPLE WAVELENGTH, MULTIPLE DIODE LASER ROS

[75] Inventor: James J. Appel, Brighton, N.Y.

[73] Assignee: Xerox Corporation, Stamford, Conn.

[21] Appl. No.: 660,173

[22] Filed: Feb. 26, 1991

Related U.S. Application Data

[63] Continuation of Ser. No. 490,212, Mar. 8, 1990, abandoned.

[51] Int. Cl.$^5$ .............................................. G02B 26/08
[52] U.S. Cl. .................................... 359/212; 359/837; 250/578.1; 250/236
[58] Field of Search .............. 350/6.8, 6.7, 6.5, 286, 350/421, 168, 6.1; 346/108; 359/205, 206, 212, 213, 197, 216, 217, 615, 669, 831, 837; 250/236, 578.1, 235

[56] References Cited

U.S. PATENT DOCUMENTS

| | | | |
|---|---|---|---|
| 3,871,750 | 3/1975 | Mecklenborg | 350/286 |
| 4,107,701 | 8/1978 | Sprague et al. | 346/108 |
| 4,268,110 | 5/1981 | Ford | 350/6.7 |
| 4,445,125 | 4/1984 | Scifres et al. | 346/108 |
| 4,514,050 | 4/1985 | Stites | 350/168 |
| 4,547,038 | 10/1985 | Mari | 359/212 |
| 4,637,679 | 1/1987 | Funato | 350/6.5 |
| 4,770,507 | 9/1988 | Arimoto et al. | 350/421 |
| 4,796,964 | 1/1989 | Connell et al. | 350/6.8 |
| 4,828,371 | 5/1989 | McCaslin et al. | 350/421 |
| 4,878,066 | 10/1989 | Shiraishi | 346/108 |
| 4,949,100 | 8/1990 | Hidaka | 346/108 |
| 4,978,976 | 12/1990 | Okino | 346/108 |
| 5,089,908 | 2/1992 | Jodoin et al. | 359/212 |

FOREIGN PATENT DOCUMENTS 1-163718  6/1989  Japan .

Primary Examiner—Bruce Y. Arnold
Assistant Examiner—James Phan

[57] ABSTRACT

A multiple diode laser ROS scanning system is modified to eliminate the need for buffering scan lines so that they can be brought into the required adjacent lines at a photosensitive surface. The wavelength of the diode outputs are selected such that each diode differs from the other within a selected range. The beams are collimated and directed through a dispersive element such as a prism which is positioned so as to cause the beams to converge towards each other. After reflection from a reflective facet surface of a polygon, the beams are swept across the surface of an image media as adjacent scan lines.

2 Claims, 1 Drawing Sheet

MULTIPLE WAVELENGTH, MULTIPLE DIODE LASER ROS

This is a continuation of application Ser. No. 07/490,212, filed Mar. 8, 1990, now abandoned.

BACKGROUND AND MATERIAL DISCLOSURE STATEMENT

The present invention relates to a laser printing system utilizing a multiple wavelength, multiple diode laser and, more particularly, to an improved system which further includes a dispersive element positioned in the optical scanning path to cause the diode outputs to be scanned as adjacent lines at a photosensitive image surface.

It is known in the scanning art to utilize a multiple laser beam source for scanning a plurality of lines on a recording medium surface simultaneously with a plurality of laser beam outputs. This technique is finding increasing usage because it substantially increases the effective printing speed of a system compared to the conventional laser ROS printer using a single output laser source. U.S. Pat. No. 4,637,679 discloses a multibeam scanning system utilizing two semi-conductor laser sources LD1, LD2, which are arranged as shown in FIG. 2 of the patent. Their output beams are formed into parallel light flux which are polarized perpendicularly to each other. Each beam is independently modulated by signals of the scanning line of an odd number and an even number, respectively, and it then becomes possible to write information as multiple scanning lines. Further advances in the art have led to the laser emitter sources being formed within the same semi-conductor chip. An example of this type of scan system is found in U.S. Pat. No. 4,445,125 assigned to the same assignee as the present invention.

One of the problems encountered with the prior art multiple beam laser scanning systems is that because the distance (pitch) between the multiple diodes is large compared with the emitting area of the diode (typically a minimum of five times larger), diode outputs are imaged on the photoreceptor several scan lines apart. In the prior art, the problem has been addressed by using an electronic buffer to first store the scan lines of information and print them in interlaced fashion. Such buffers, however, add to the cost and complexity of the system.

The present invention addresses the above problem by using a multiple diode laser with each diode having differing output wavelengths. A dispersive element, such as a prism or diffraction grating, is then positioned along the optical path for bringing focused beams closer together when they are imaged at the photoreceptor.

The use of dispersive elements in scanning systems to accomplish various functions is known in the art. A Toshiba publication 63-155018 discloses placing prisms in the object path of a polygon scanner to generate parallel beams, but the beams, not being of different wavelength, are not brought together as adjacent lines as is disclosed in the present invention. Other relevant prior art references are: U.S. Pat. No. 4,268,110 to Ford discloses a facet angle corrector for a multi-faceted optical scanner which reduces banding in the output image. The corrector comprises a corrector plate supporting a plurality of transparent discs having a slight wedge angle to precisely control the angle at which the beam is to be bent. See FIG. 1 of the patent which shows laser source 10, light beam 11 expanded light beam 12, beam expanding optics 13, pyramidal scanner 14 corrector means 31, plate 32, and discs 36 having a light wedge. U.S. Pat. No. 4,770,507 to Arimoto et al. discloses an optical system for converting the shape of a light beam using the refraction of prisms by using at least two types of prisms having different values of refractivity. Geometrical properties of the optics are stable regardless of changes in light beam wavelengths. U.S. Pat. No. 4,828,371 to McCaslin, assigned to Xerox Corporation, discloses diode laser beam correction optics which use an expansion prism pair separated by a rotationally adjustable mirror. Beam expansion can be controlled by varying the rotation and translation of the prisms. See FIG. 3 of the patent which shows prisms 42 and 44, mirror 46, and diode laser 13. U.S. Pat. No. 3,871,750 to Mecklenborg discloses a laser beam expansion apparatus for an optical disk drive. The apparatus has prisms 22 and 24, mirror 14, beam splitter 15, optical disc 16, and laser 13. U.S. Pat. No. 4,796,964 to Connell et al., assigned to Xerox Corporation, discloses a method of utilizing a multiple emitter solid state laser in a raster output scanner. Plural overlapped laser beams are focused onto a recording medium by selectively sequencing the lasers to that there will not be any nonuniformity due to optical interference of the laser beams. See scanning imaging lens 48 in FIG. 1 of the patent which produces overlapping laser spots on the recording surface.

More particularly, the invention relates to a multibeam scanning system comprising: a laser light source for generating a plurality of light beam outputs, each output having a different wavelength from the other, optical scanning means for receiving said output beams and directing the beams along an optical path as a plurality of scanning beams to simultaneously form a plurality of focused adjacent lines on the surface of a photosensitive plane, the scanning means further including a dispersive element positioned along the optical path so as to bring the focused scanning beams into adjacent lines, respectively, at the photoreceptor.

DESCRIPTION OF THE INVENTION

Figure 1:
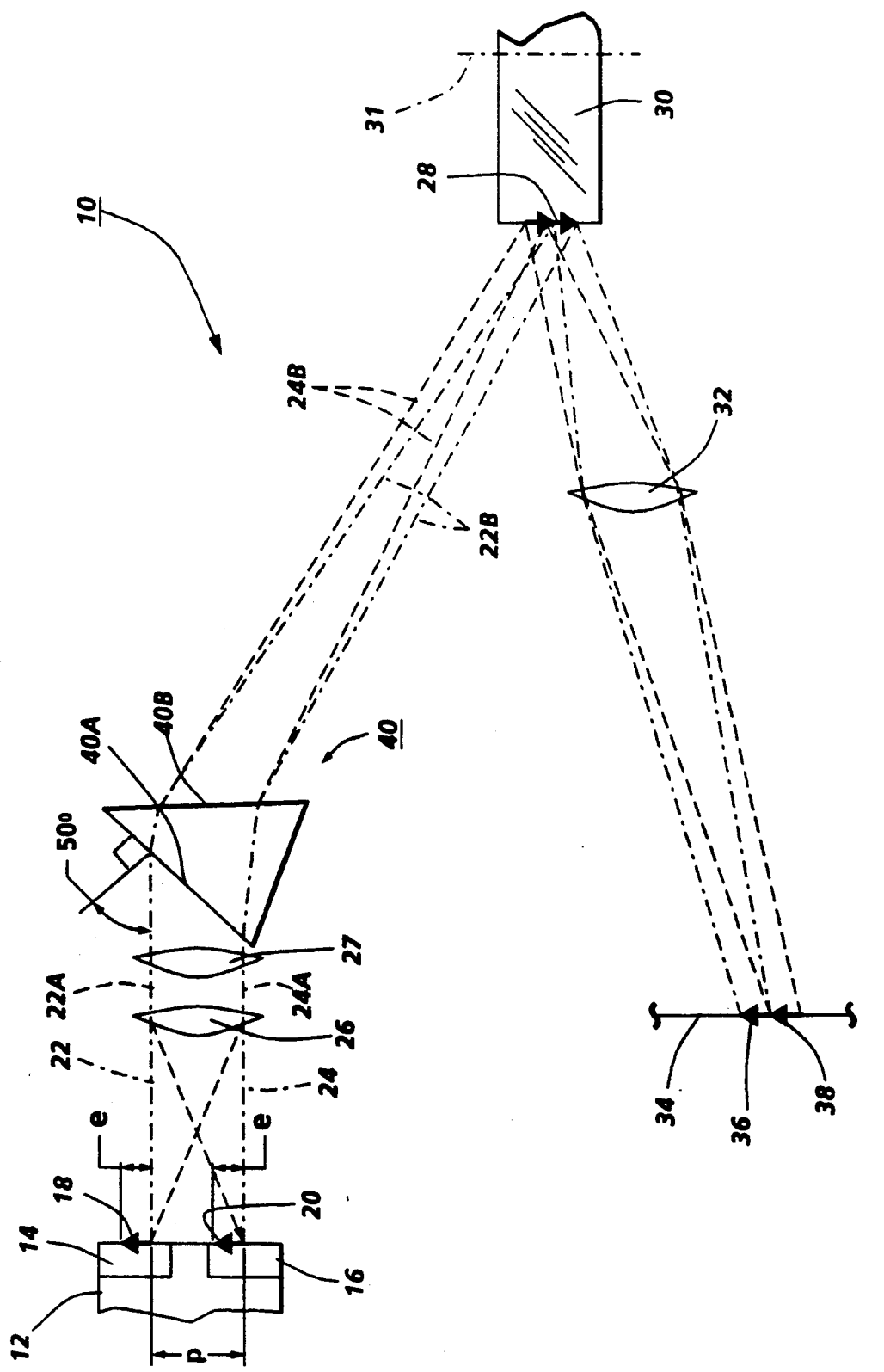
FIG. 1 shows a side schematic view of a multi-beam ROS scanning system with diode outputs of differing wavelengths passing through a prism and focused onto an image plane as adjacent lines.

Referring now to the Figure, there is shown, in side view, a dual beam ROS system 10. The invention, however, is not limited to a laser source with dual diode outputs, but encompasses arrangements that may include more than two diodes. A laser source 12 incorporates 2 independently addressable diodes 14, 16, each diode having emitters 18, 20, respectively. Diodes 14, 16 can be formed on a single semiconductor chip as is disclosed in U.S. Pat. No. 4,445,125, whose contents are hereby incorporated by reference. Emitters 18, 20 have a FWHM (full width at half maximum) of e. The emitters are separated by a pitch width p which is approximately five times the distance e. (This distance ratio is a minimum; the actual ratio may be larger. Widths shown are not to scale). Laser beam outputs 22 and 24, according to a first aspect of the invention, are each at a wavelength which differs from the other. Beams 22 and 24 are collimated by collimator lens 26 and focused by cylindrical lens 27, at some magnification determined by the position of lens 26, 27 along the optical path. The collimated beams are focused by cylindrical lens 27 onto a facet 28 of multi-faceted mirror polygon 30. The beams are reflected from facet 28 as polygon 30 rotates along axis 31 and pass through a wobble correcting lens 32. The beams are then swept across the surface of photosensitive image plane 34 in the fast scan direction (into the page), forming scan lines 36, 38 across the image medium. According to a second aspect of the invention, a dispersive element, in this embodiment a 60 degree prism 40, is positioned along the optical path. The prism is placed between lens 27 and polygon 30, although other positions are possible. Prism 40 has power in the sagittal direction. The function of prism 40, as will be seen, is to decrease the interdiode distance P so that scan lines 36, 38 are formed adjacent to each other at the image plane.

A specific example of the scanning system is now provided to enable a better appreciation of the significance of the differing diode wavelength outputs and the use of prism 40. Referring again to FIG. 1, laser source 12 is formed with diodes 14, 16 having emitters 18, 20 with an FWHM (e) of 0.002 mm (two microns). Interdiode spacing is 0.01 mm or (10 microns). Output 24 has a wavelength of 790 nm and output 22 has a wavelength of 761 nm. Prism 40 is a 60 degree prism with surface 40A inclined so that rays 22 and 24 are directed against surface 40A at a 50° angle of incidence. Emitter outputs 22, 24 are expanded approximately 20× so that they form a spot size of 0.04 mm (40 microns) at the face of facet 28, and subsequently at the image plane 34. Lens 32 is a 1× toroidal lens.

In operation, diodes 14 and 16 are separately and simultaneously addressed producing laser beam outputs 22 and 24 having wavelengths of 761 nm and 790 nm, respectively. The beams are collimated by collimator lens 26 and are converted to collimated parallel beams 22A, 24A. The collimated beams then pass through convergent cylindrical lens 27, and enters prism 40 through surface 40A. Because the index of refraction of the glass decreases with decreasing wavelength, beams 22A and 24A are refracted by surface 40A and directed slightly downward so they are no longer parallel, since the lower wavelength output 22 will be refracted less. Upon incidence and refraction of the two rays at surface 40B, the separation between the two beams 22B and 24B narrows until the beams, enlarged to a spot size of about 40 microns, are imaged at polygon facet 28, and reflected therefrom. The reflected beams are swept in the fast scan direction forming scan lines 36 and 38 after passing through 1× wobble correcting lens 32.

Although the location of prism 40 is shown between the converging lens 27 and polygon 30, it may be located at other positions along the optical path as determined by common lens design practice.

While the invention is disclosed in the context of a dual beam diode, the invention is not thereby limited. It can be implemented, for example, in a 3 or 4 diode array, so long as diode outputs have different wavelengths from the others. The diodes may also be located in multiple chip sources. The physical size of the prism may have to be increased to accommodate the increased number of rays passing therethrough, and while a prism has been shown as the beam dispersive element, other elements may be used such as a reflective or transmissive refractive grating.

While the invention has been described with reference to the structure disclosed, it will be appreciated that numerous changes and modifications are likely to occur to those skilled in the art, and it is intended to cover all changes and modifications which fall within the true spirit and scope of the invention.

I claim:

1. A light scanning system comprising:
   a photosensitive surface,
   a semiconductor diode laser array including a plurality of linearly aligned diode lasers on a common semiconductor substrate, each diode having emitters which are separated by a pitch width p,
   first means for generating a video drive signal,
   second means for supplying said drive signal to at least some of said plurality of lasers of said array to provide for emission of a plurality of light beams from said array, each output having a wavelength different from the other by at least approximately 30 nm,
   optical means for focusing said plurality of light beams at said photosensitive surface,
   scanning means for scanning said plurality of light beams across said photosensitive surface to form adjacent scan lines, and
   optical refracting means positioned along the optical path for causing multiple output beams passing there through to be refracted along a convergent path as a function of said wavelength differences.

2. The scanning system of claim 1 where said optical refracting means is a single prism having power in a sagittal plane, said passing of said plurality of light beams through said prism causing the sagittal separation distance of said beams to decrease so that, said adjacent lines at the photosensitive surface are separated by a distance less than said initial distance p.

* * * * *